(12) United States Patent
Takishima (10) Patent No.: US 6,922,839 B2
(45) Date of Patent: Jul. 26, 2005

(54) CARTRIDGE FOR PROTECTING OPTICAL RECORDING MEDIA

(75) Inventor: Suguru Takishima, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 154 days.

(21) Appl. No.: 10/648,395

(22) Filed: Aug. 27, 2003

(65) Prior Publication Data

US 2004/0042383 A1 Mar. 4, 2004

(30) Foreign Application Priority Data

Aug. 29, 2002 (JP) ........................................ 2002-251679
Aug. 29, 2002 (JP) ........................................ 2002-251680

(51) Int. Cl.⁷ ............................................. G11B 17/04
(52) U.S. Cl. ...................... 720/643; 369/291; 369/75.1; 369/75.2; 360/99.02; 360/99.06
(58) Field of Search ................................ 720/643, 644; 360/99.02, 99.06; 369/291, 75.1, 75.2

(56) References Cited

U.S. PATENT DOCUMENTS

| 5,386,406 | A | * | 1/1995 | Ikuma et al. ................ 720/643 |
| 5,612,940 | A | * | 3/1997 | Otsuka et al. ............... 720/631 |
| 5,892,636 | A | * | 4/1999 | Kabasawa et al. ........ 360/99.06 |
| 5,896,357 | A | * | 4/1999 | Shinozaki et al. ........... 720/643 |
| 2002/0126614 | A1 | * | 9/2002 | Bagnell et al. ............. 369/77.2 |
| 2002/0172128 | A1 | * | 11/2002 | Kim et al. .................. 369/77.2 |
| 2004/0062176 | A1 | * | 4/2004 | Liang et al. ................ 369/77.2 |

FOREIGN PATENT DOCUMENTS

JP 10-40626 2/1998

OTHER PUBLICATIONS

English Language Abstract JP10–40626.

* cited by examiner

*Primary Examiner*—A. J. Heinz
*Assistant Examiner*—Mark Blouin
(74) *Attorney, Agent, or Firm*—Greenblum & Bernstein, P.L.C.

(57) ABSTRACT

There is provided an optical recording media cartridge, which is provided with a case that accommodates the optical recording media and that has an opening, and a shutter that is attached to the case and that is movable between a first position at which the shutter covers the opening and a second position. The optical recording media cartridge is further provided with a shutter lock mechanism that locks the shutter while the shutter is positioned at the first position, and a shutter release mechanism that releases the shutter locked by the shutter lock mechanism by utilizing a magnetic force exerted thereon.

27 Claims, 9 Drawing Sheets

CARTRIDGE FOR PROTECTING OPTICAL RECORDING MEDIA

BACKGROUND OF THE INVENTION

The present invention relates to a cartridge for protecting an optical recording media accommodated therein.

Generally, the cartridge for protecting the optical recording media such as an MO (magneto-optic disc) has an opening from which the optical recording media is exposed and a shutter which covers the opening while the cartridge is detached from an optical disc drive. Since the opening is covered by the shutter, the MO in the cartridge can be protected against dust.

Further, the cartridge has a shutter lock mechanism which keeps the shutter closed while the cartridge is detached from the optical disc drive and a shutter release mechanism which release the shutter when the cartridge is inserted into the optical disc drive.

Figure 9:
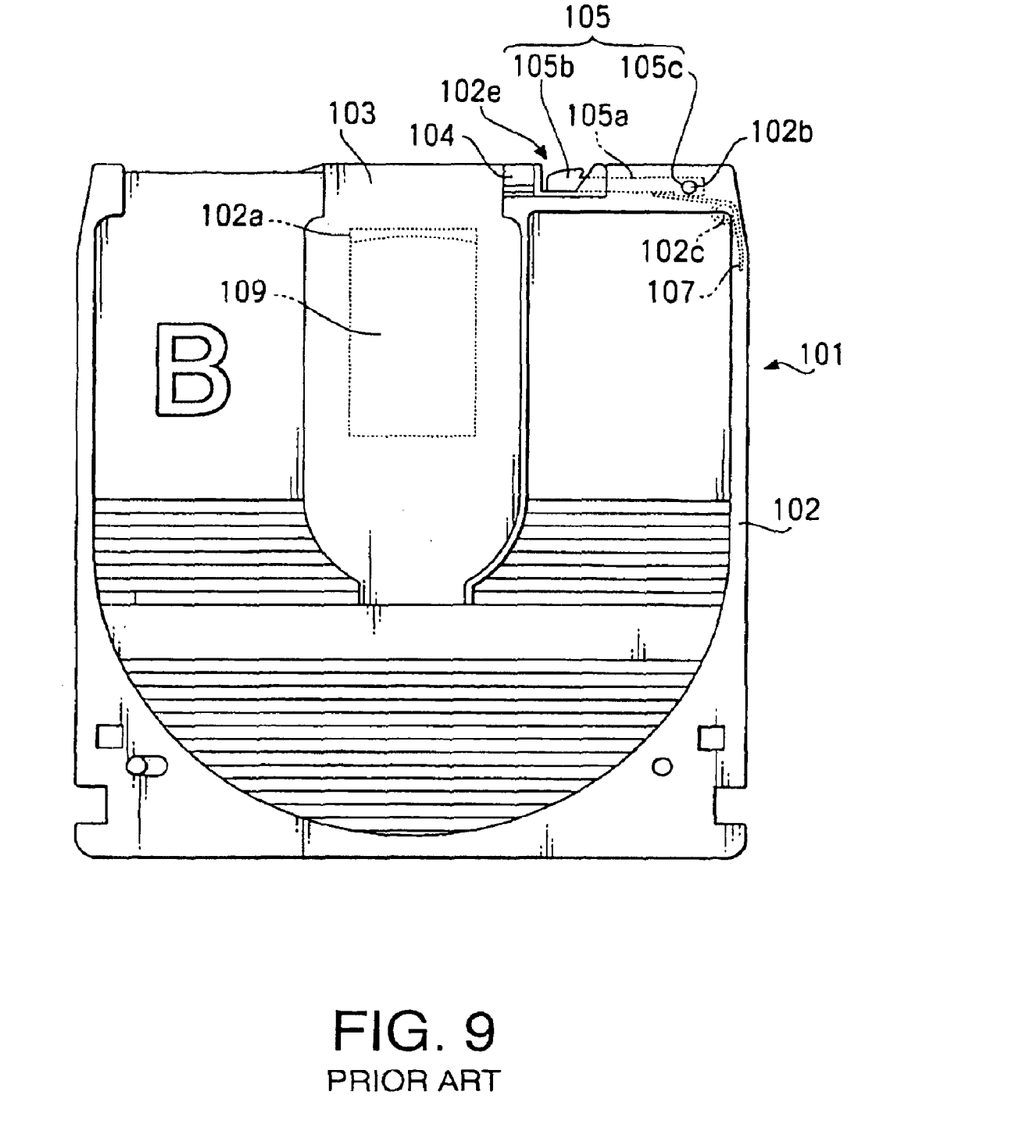
FIG. 9 shows a certain type of a conventional cartridge for a magneto-optic disc.

FIG. 9 shows a certain type of a conventional known cartridge 101 for a magneto-optic disc 109. As shown in FIG. 9, the cartridge 101 has a case 102, a shutter 103, a reception member 104 attached to the shutter 103 by screws, a lock arm 105 rotatably attached to the case 102, a torsion spring 107, and the magneto-optic disc 109 accommodated in the case 102. The case 102 has an opening 102a from which the disc 109 is exposed while the cartridge 101 is inserted in an optical disc drive (not shown). The shutter 103 is slidably attached to the case 102 and covers the opening 102a while the cartridge 101 is not used, i.e., while the cartridge is detached from the optical disc drive.

While the cartridge 101 is attached to the optical disc drive, a head provided in the optical disc drive is driven to record/reproduce information to/from the magneto-optic disc 109 through the opening 102a.

In a situation shown in FIG. 9, i.e., while the cartridge 101 is not used, the shutter 103 is locked by engagement of the lock arm 105 and the reception member 104.

The lock arm 105 has an arm portion 105a, a hook portion 105b provided at one end of the arm portion 105a, and a hole 105c formed on the other end of the arm portion 105a. As shown in FIG. 9, a shaft 102b is formed on an inside wall of the case 102. The lock arm 105 is rotatably attached to the shaft 102b at the hole 105c formed on the other end of the arm portion 105a.

The torsion spring 107 is attached to a shaft 102c formed on the inside wall of the case 102. One end of the torsion spring 107 contacts with the arm portion 105a, and the other end of the torsion spring 107 contacts with an inside wall of the case 102. Since the torsion spring 107 pushes the lock arm 105 upward on the FIG. 9, the hook portion 105b engages with the reception member 104. Consequently, the shutter 103 is kept closed while the cartridge 101 is not used.

Although the above described configuration of the cartridge 101 enables the shutter 103 to be kept closed while the cartridge 101 is detached from the optical disc drive, the conventional cartridge 101 has a problem that the shutter 103 is relatively easily opened by pushing the lock arm 105 using a pin through an opening 102e. The opening 102e is essential to mechanically release the shutter 103 when the cartridge 101 is attached to the optical disc drive.

SUMMARY OF THE INVENTION

The present invention is advantageous in that it provides an optical recording media cartridge which can reliably lock a shutter attached thereon while the optical recording media cartridge is detached from an optical recording media drive.

According to an aspect of the present invention, there is provided an optical recording media cartridge for protecting an optical recording media. The optical recording media cartridge is provided with a case that accommodates the optical recording media and that has an opening from which the optical recording media is exposed, and a shutter that is attached to the case and that is movable between a first position at which the shutter covers the opening and a second position. The optical recording media cartridge is further provided with a shutter lock mechanism that locks the shutter while the shutter is positioned at the first position, and a shutter release mechanism that releases the shutter locked by the shutter lock mechanism by utilizing a magnetic force exerted thereon.

Since a locked state of the shutter is released when the magnetic force is exerted on the shutter release mechanism, it is prevented that the shutter is accidentally opened, for example, by using a pin.

Optionally, the shutter lock mechanism and the shutter release mechanism may be mounted inside the case, and the optical recording media cartridge may substantially completely cover the optical recording media, the shutter lock mechanism and the shutter release mechanism when the shutter is positioned at the first position.

Still optionally, at least a portion of the optical recording media may be exposed when the shutter is positioned at the second position.

In a particular case, the shutter lock mechanism may include a lock member attached to the shutter. In this case, the lock member locks the shutter while the shutter is positioned at the first position.

Optionally, the lock member may have a hook that engages with a recess formed on the case while the shutter is positioned at the first position. In this case, the shutter is locked by engagement of the hook and the recess.

In a particular case, the shutter release mechanism may include a magnet attached to the lock member, and the engagement of the hook of the lock member and the recess of the case is released by the magnetic force exerted on the magnet attached to the lock member.

In a particular case, the magnetic force exerted on the magnet may be an attractive force.

In a particular case, the attractive force may act on the magnet when an external magnet approaches the magnet from outside the optical recording media cartridge.

In a particular case, the attractive force may act on the magnet when an external magnetic material approaches the magnet from outside the optical recording media cartridge.

In a particular case, the magnetic force exerted on the magnet may be a repulsive force.

In a particular case, the repulsive force may act on the magnet when an external magnet approaches the magnet from outside the optical recording media cartridge.

In a particular case, the shutter release mechanism may include a magnetic material attached to the lock member, and the engagement of the hook of the lock member and the recess of the case is released by the magnetic force exerted on the magnetic material attached to the lock member.

In a particular case, the magnetic force exerted on the magnetic material may be an attractive force.

In a particular case, the attractive force may act on the magnetic material when an external magnet approaches the magnetic material from outside the optical recording media cartridge.

In a particular case, the shutter lock mechanism may include a lock member attached to the case. In this case, the lock member locks the shutter while the shutter is positioned at the first position.

Optionally, the lock member may have a hook that engages with a recess formed on the shutter while the shutter is positioned at the first position. In this case, the shutter is locked by engagement of the hook and the recess.

In a particular case, the shutter release mechanism may include a magnet attached to the lock member, and the engagement of the hook of the lock member and the recess of the shutter is released by the magnetic force exerted on the magnet attached to the lock member.

In a particular case, the shutter release mechanism may include a magnetic material attached to the lock member, and the engagement of the hook of the lock member and the recess of the shutter is released by the magnetic force exerted on the magnetic material attached to the lock member.

In a particular case, the magnetic force exerted on the shutter release mechanism may be an attractive force.

In a particular case, the magnetic force exerted on the shutter release mechanism may be a repulsive force.

Optionally, the optical recording media may include an optical disc.

According to another aspect of the present invention, there is provided an optical recording media drive for recording/reproducing information to/from an optical recording media accommodated in a cartridge. The cartridge includes a case that accommodates the optical recording media and that has an opening from which the optical recording media is exposed, a shutter that is attached to the case and that is movable between a first position at which the shutter covers the opening and a second position, a shutter lock mechanism that locks the shutter while the shutter is positioned at the first position, and a shutter release mechanism that releases the shutter locked by the shutter lock mechanism by utilizing a magnetic force exerted thereon. The optical recording media drive includes a body, a magnet that exerts the magnetic force when the cartridge is attached to the optical recording media drive, and a shutter open member that moves the shutter of the cartridge from the first position to the second position when the cartridge is attached to the optical recording media drive.

Since a locked state of the shutter is released when the magnetic force is exerted on the shutter release mechanism, it is prevented that the shutter is accidentally opened, for example, by using a pin.

Optionally, the shutter open member may include an arm member rotatably attached to the body, the arm member having an end portion which engages with a notch formed on the cartridge. The end portion of the arm member moves when the cartridge is attached to the optical recording media drive so as to move the shutter of the cartridge from the first position to the second position. The magnet is attached to the end portion of the arm member.

Still optionally, the body may have a slot to which the cartridge is attached.

According to another aspect of the present invention, there is provided an optical recording media drive for recording/reproducing information to/from an optical recording media accommodated in a cartridge. The cartridge includes a case that accommodates the optical recording media and that has an opening from which the optical recording media is exposed, a shutter that is attached to the case and that is movable between a first position at which the shutter covers the opening and a second position, a shutter lock mechanism that locks the shutter while the shutter is positioned at the first position, and a shutter release mechanism that releases the shutter locked by the shutter lock mechanism by utilizing a magnetic force exerted thereon. The optical recording media drive includes a body, a magnetic material that exerts the magnetic force when the cartridge is attached to the optical recording media drive, and a shutter open member that moves the shutter of the cartridge from the first position to the second position when the cartridge is attached to the optical recording media drive.

Since a locked state of the shutter is released when the magnetic force is exerted on the shutter release mechanism, it is prevented that the shutter is accidentally opened, for example, by using a pin.

According to another aspect of the present invention, there is provided a system having an optical recording media cartridge and an optical recording media drive for recording/reproducing information to/from an optical recording media accommodated in the optical recording media cartridge. The optical recording media cartridge includes a case that accommodates the optical recording media and that has an opening from which the optical recording media is exposed, a shutter that is attached to the case and that is movable between a first position at which the shutter covers the opening and a second position, a shutter lock mechanism that locks the shutter while the shutter is positioned at the first position, and a shutter release mechanism that releases the shutter locked by the shutter lock mechanism by utilizing a magnetic force exerted thereon. The optical recording media drive includes a body, a magnet that exerts the magnetic force when the cartridge is attached to the optical recording media drive, and a shutter open member that moves the shutter of the optical recording media cartridge from the first position to the second position when the optical recording media cartridge is attached to the optical recording media drive.

Since a locked state of the shutter is released when the magnetic force is exerted on the shutter release mechanism, it is prevented that the shutter is accidentally opened, for example, by using a pin.

According to another aspect of the present invention, there is provided a system having an optical recording media cartridge and an optical recording media drive for recording/reproducing information to/from an optical recording media accommodated in the optical recording media cartridge. The optical recording media cartridge includes a case that accommodates the optical recording media and that has an opening from which the optical recording media is exposed, a shutter that is attached to the case and that is movable between a first position at which the shutter covers the opening and a second position, a shutter lock mechanism that locks the shutter while the shutter is positioned at the first position, and a shutter release mechanism that releases the shutter locked by the shutter lock mechanism by utilizing a magnetic force exerted thereon. The optical recording media drive includes a body, a magnetic material that exerts the magnetic force when the cartridge is attached to the optical recording media drive, and a shutter open member that moves the shutter of the optical recording media cartridge from the first position to the second position when the optical recording media cartridge is attached to the optical recording media drive.

Since a locked state of the shutter is released when the magnetic force is exerted on the shutter release mechanism, it is prevented that the shutter is accidentally opened, for example, by using a pin.

DETAILED DESCRIPTION OF THE EMBODIMENTS

Hereinafter, embodiments according to the invention are described with reference to the accompanying drawings.

First Embodiment

Figure 1:
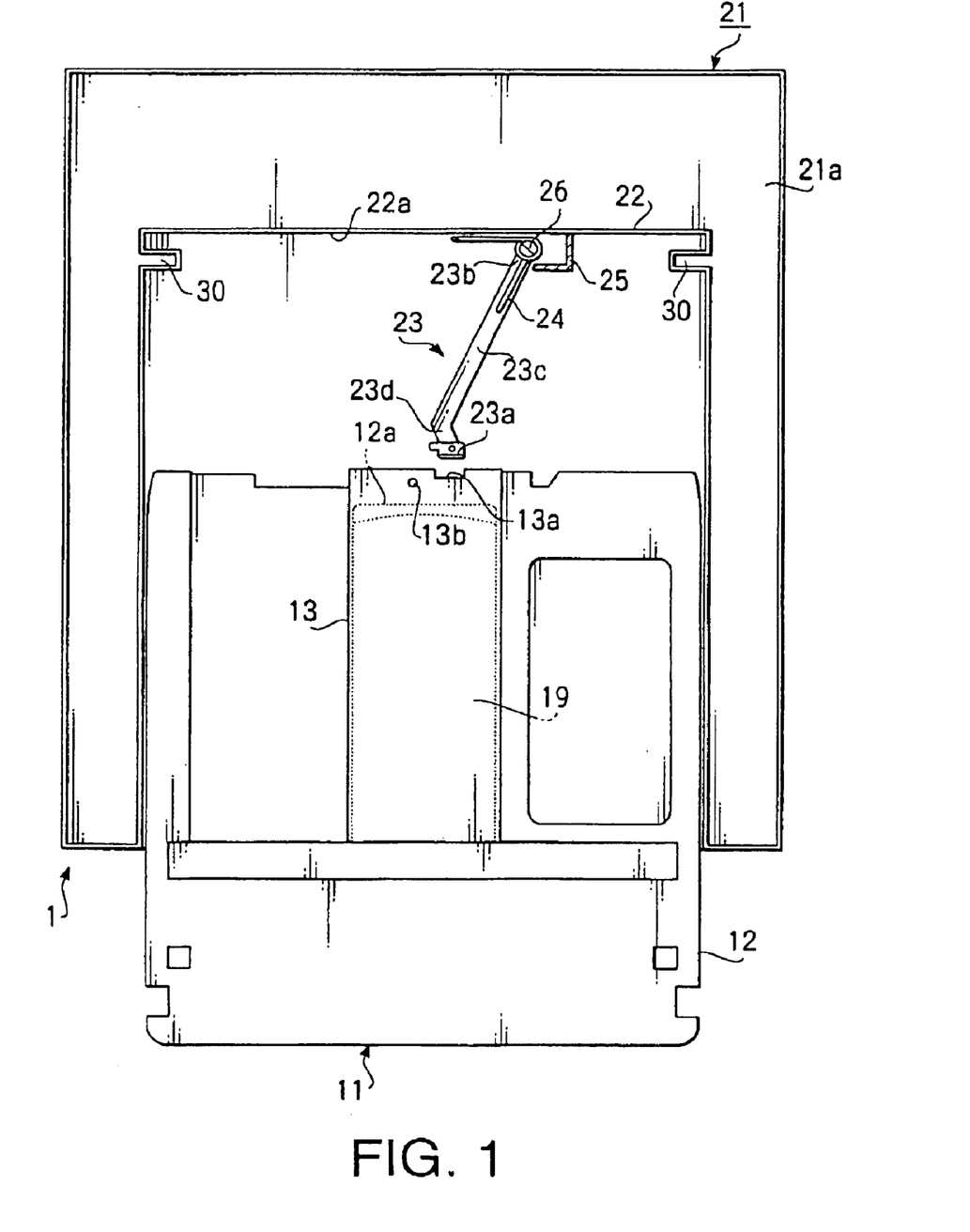
FIG. 1 shows an optical disc drive system according to a first embodiment of the present invention.
Figure 2:
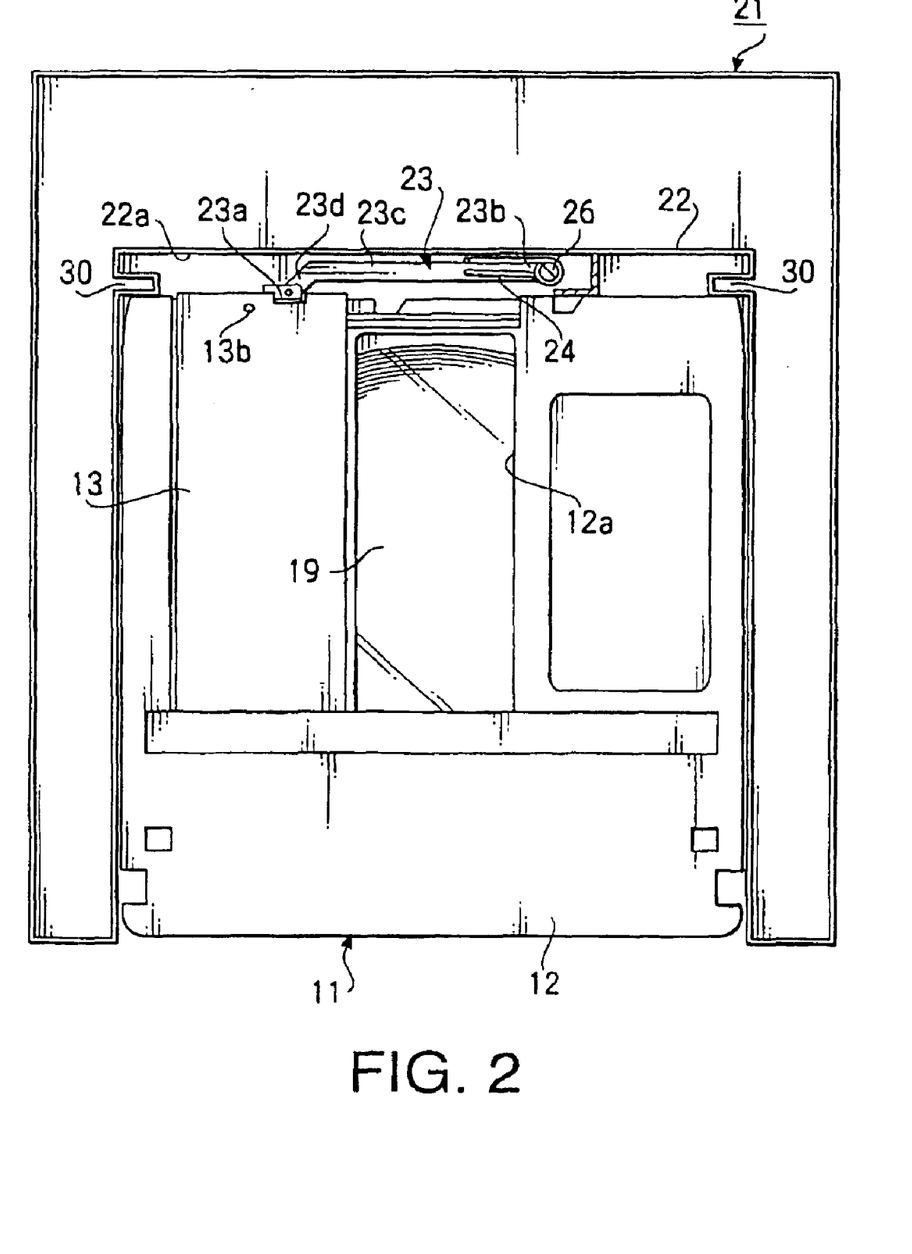
FIG. 2 shows the optical disc drive system in which an optical disc cartridge is fully inserted into a slot formed on an optical disc drive.

Each of FIGS. 1 and 2 shows an optical disc drive system 1 according to a first embodiment of the present invention. The optical disc drive system 1 has an optical disc cartridge 11 and an optical disc drive 21.

In the optical disc drive 21, various components such as an optical pick-up, a driving mechanism, and a signal processing system are accommodated. Since these components are well known in the art, detailed descriptions thereof are omitted.

As shown in FIG. 1, a body 21a of the optical disc drive 21 has a slot 22 in which the optical disc cartridge 11 is inserted. The body 21a further has a shutter open arm 23 having one end at which a hole 23b is formed and having the other end 23d to which a magnet 23a is attached.

The hole 23b of the shutter open arm 23 is attached to a shaft 26 formed on a bottom surface of the slot 22 so that the shutter open arm 23 is rotatable about the shaft 26.

A torsion spring 24 is also attached to the shaft 26. As shown in FIG. 1, one end of the torsion spring 24 contacts a side wall 22a of the slot 22, and the other end of the torsion spring 24 is fixed to an arm portion 23c of the shutter open arm 23. With this structure, the torsion spring 24 exerts a force on the shutter open arm 23 to turn the shutter open arm 23 counterclockwise.

A stopper 25 is attached to the bottom surface of the slot 22 so as to limit a range of a swing motion of the shutter open arm 23. Therefore, the shutter open arm 23 is held at an initial position shown in FIG. 1.

The optical disc cartridge 11 has a case 12, a shutter 13 slidably attached to the case 12, and an optical disc 19 accommodated in the case 12. The case 12 has an opening 12a from which the optical disc 19 is exposed while the optical disc cartridge 11 is inserted into the slot 22. The shutter 13 is slidable in a horizontal direction in FIG. 1.

The shutter 13 covers the opening 12a while the optical disc cartridge 11 is not used so as to prevent the optical disc 19 from being exposed. As described in detail below, the optical disc cartridge 11 has a lock mechanism which locks the shutter 13 while the optical disc cartridge 11 is not used. The shutter 13 has a notch 13a which engages with the magnet 23a attached to the shutter open arm 23.

When the optical disc cartridge 11 is inserted into the slot 22, i.e., when the optical disc cartridge 11 is moved from a position shown in FIG. 1 to a position shown in FIG. 2, the magnet 23a engages with the notch 13a of the shutter 13 and releases a locked state of the shutter 13 so that the shutter 13 becomes slidable on the case 12. As the optical disc cartridge 11 moves toward the side wall 22a of the slot 22, the shutter open arm 23 rotates clockwise and makes the shutter 13 slide to the left on FIG. 1.

As shown in FIG. 2, when a tip portion of the optical disc cartridge 11 contacts stoppers 30 and 30 formed on the slot 22, the shutter 13 is fully opened by the shutter open arm 23. In a situation shown in FIG. 2, the optical disc cartridge 11 is fully inserted into the slot 22. The shutter open arm 23 is now substantially parallel to the side wall 22a of the slot 22.

Next, the lock mechanism for locking the shutter 13 while the optical disc cartridge 11 is detached from the slot 22, and a shutter release mechanism which releases the locked state of the shutter 13 will be described in detail.

Figure 3:
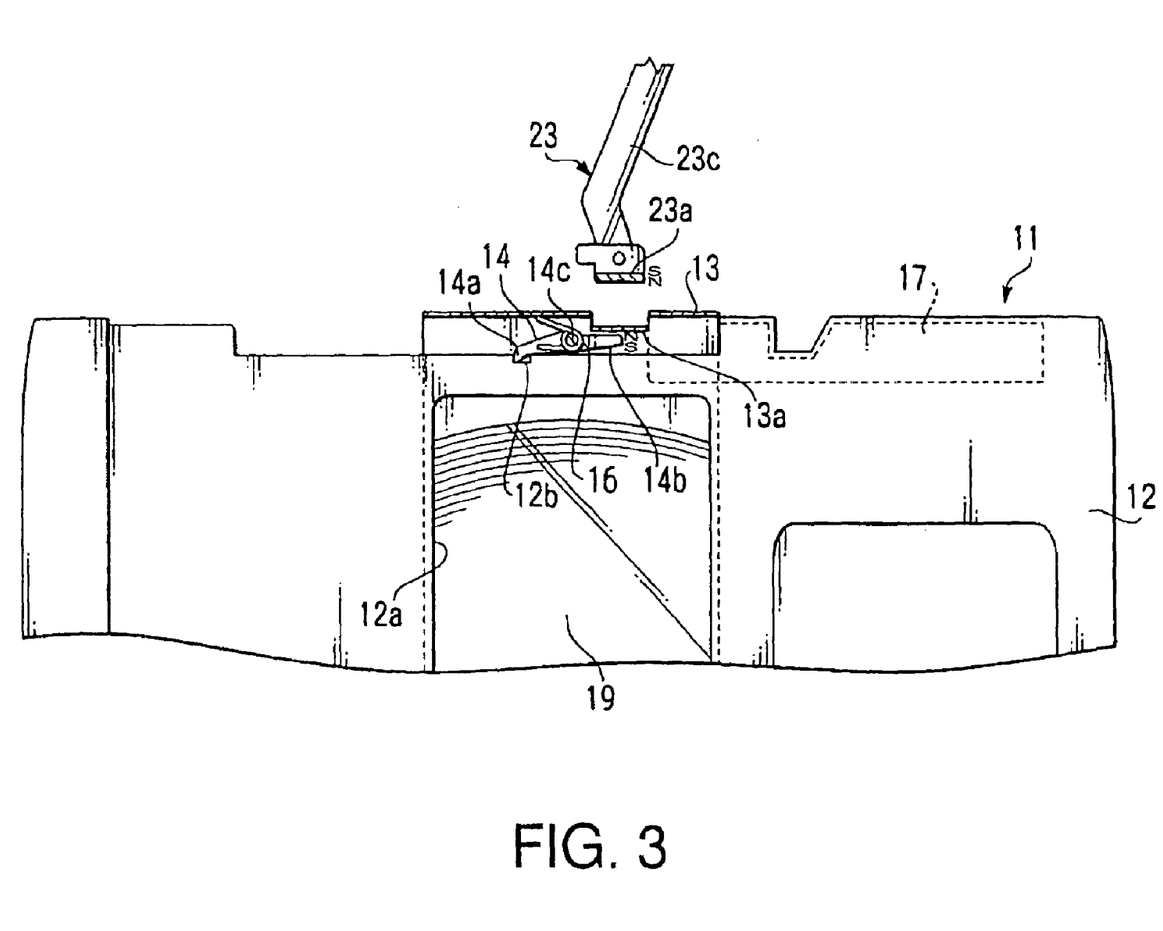
FIG. 3 is an enlarged view of the optical disc cartridge illustrating a situation where a magnet of a shutter open arm does not engage with a notch of a shutter.
Figure 4:
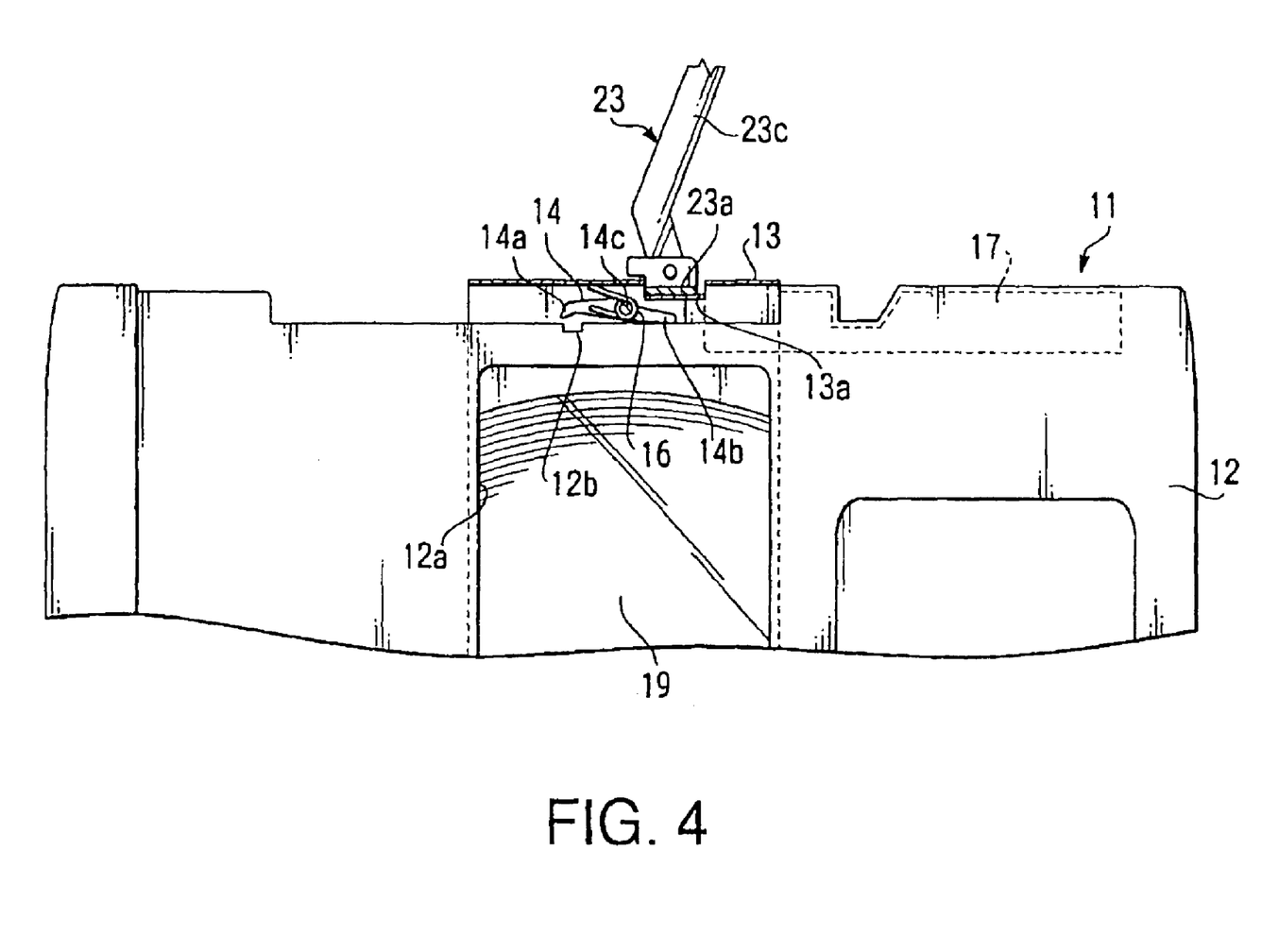
FIG. 4 is an enlarged view of the optical disc cartridge illustrating a situation where the magnet of the shutter open arm engages with the notch of the shutter.

FIGS. 3 and 4 are enlarged views of an upper portion of the optical disc cartridge 11. FIG. 3 shows a situation where the magnet 23a of the shutter open arm 23 does not engage with the notch 13a of the shutter 13. FIG. 4 shows a situation where the magnet 23a of the shutter open arm 23 engages with the notch 13a of the shutter 13.

As shown in FIG. 3, the optical disc cartridge 11 has a spacer 17 which is mounted inside the case 12 and which is fixed to the shutter 13. The spacer 17 is guided by rails (not shown) formed on an inside surface of the case 12 and is slidable in a horizontal direction on FIG. 3.

The optical disc cartridge 11 includes a lock arm 14 and a torsion spring 16. The lock arm 14 has a shaft 14c, a hook 14a formed at one end thereof, and a magnet 14b attached to the other end thereof. The shaft 14c of the lock arm 14 is inserted into a hole 13b (see FIGS. 1 and 2) formed on the shutter 13 with the torsion spring 16 being hooked to the shaft 14c.

As shown in FIG. 3, one end of the torsion spring 16 contacts with an inside surface of the shutter 13, and the other end of the torsion spring 16 is fixed to the lock arm 14 at a position between the shaft 14c and the hook 14a. With this structure, the torsion spring 16 exerts a force on the lock arm 14 to turn the lock arm 14 counterclockwise.

Since the hook 14a of the lock arm 14 is pushed downward in the FIG. 3, the hook 14a firmly engages with a recess 12b formed on the case 12 while the shutter 13 is positioned at a position shown in FIG. 3, i.e., while the shutter 13 completely covers the opening 12a. Thus, the shutter 13 is locked by engagement of the hook 14a and the recess 12b.

The magnet 14b attached to the other end of the lock arm 14 is adjacent to the notch 13a. In addition, a surface of the magnet 14b nearest to the notch 13a, and a surface of the magnet 23a nearest to the notch 13a have the same magnetic poles. Therefore, when the magnet 23a approaches the notch 13a, repulsive forces are exerted on the magnet 23a and the magnet 14b.

It should be noted that since the lock arm 14 is completely covered by the shutter 13 and the case 12 (see FIGS. 3 and 4), the lock arm 14 can not be moved by using, for example, a pin.

When the magnet 23a contacts with the notch 13a of the optical disc cartridge 11, the lock arm 14 is rotated clockwise by the repulsive force exerted on the magnet 14b. Consequently, the hook 14a is disengaged from the recess 12b as shown in FIG. 4, which releases the locked state of the shutter 13 and makes the shutter 13 slidable on the case 12. As the optical disc cartridge 11 is inserted into the slot 22, the shutter open arm 23 slides the shutter 13. Finally, the shutter open arm 23 brings the shutter 13 to the position shown in FIG. 2.

When the optical disc cartridge 11 is pulled out, the shutter open arm 23 slides the shutter 13 right and brings the shutter 13 to the position shown in FIG. 1 because the torsion spring 26 exerts the force on the shutter open arm 23 to turn the shutter open arm 23 counterclockwise.

As described above, according to the first embodiment of the present invention, the shutter:13 is locked reliably while the shutter covers the openings 12a. The shutter 13 cannot be opened by using, for example, a pin. The locked state of the shutter 13 is released only when the optical disc cartridge 11 is inserted in the slot 22 of the optical disc drive 21. Therefore, the optical disc 19 is protected reliably.

Second Embodiment

A second embodiment of the present invention will be described with reference to FIGS. 5–8.

Figure 5:
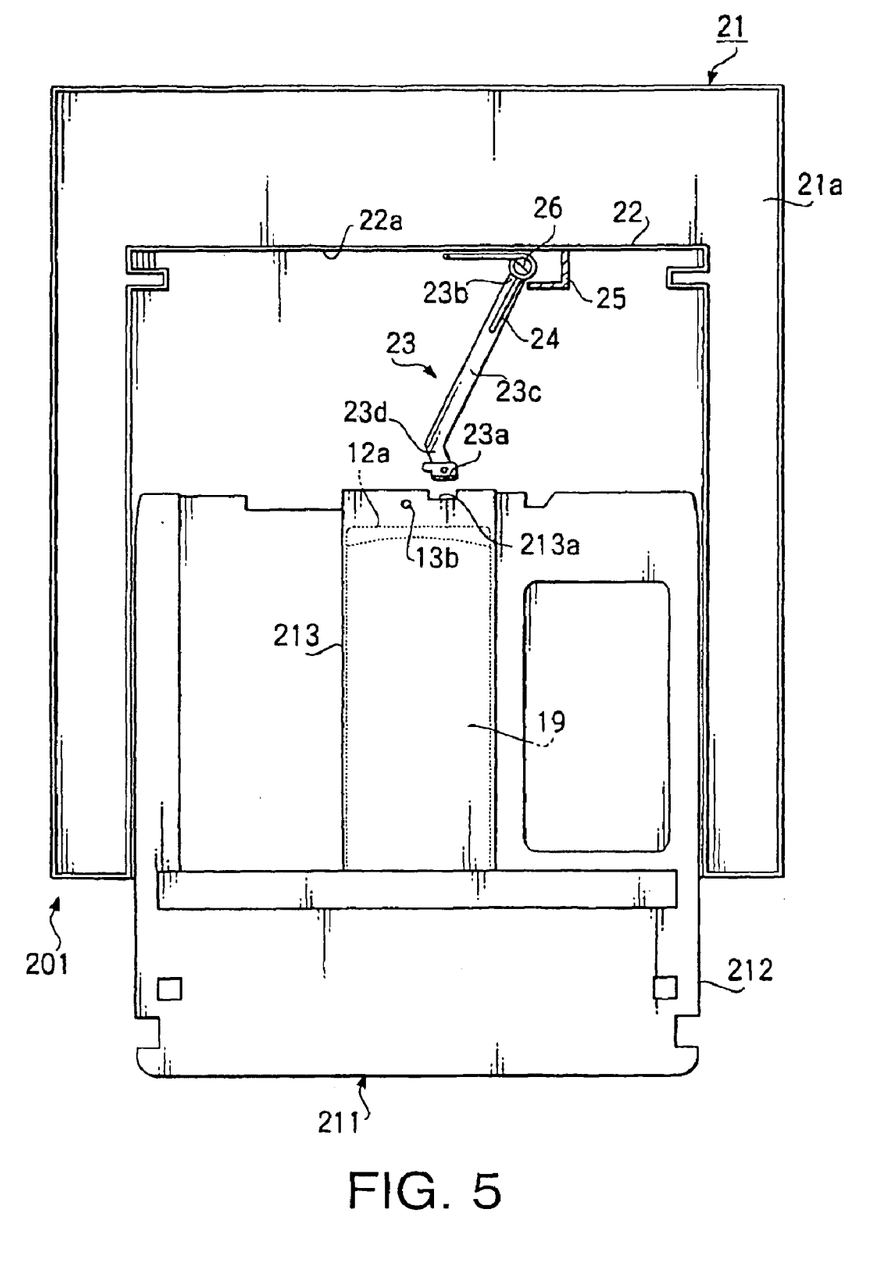
FIG. 5 shows an optical disc drive system according to a second embodiment of the present invention.
Figure 6:
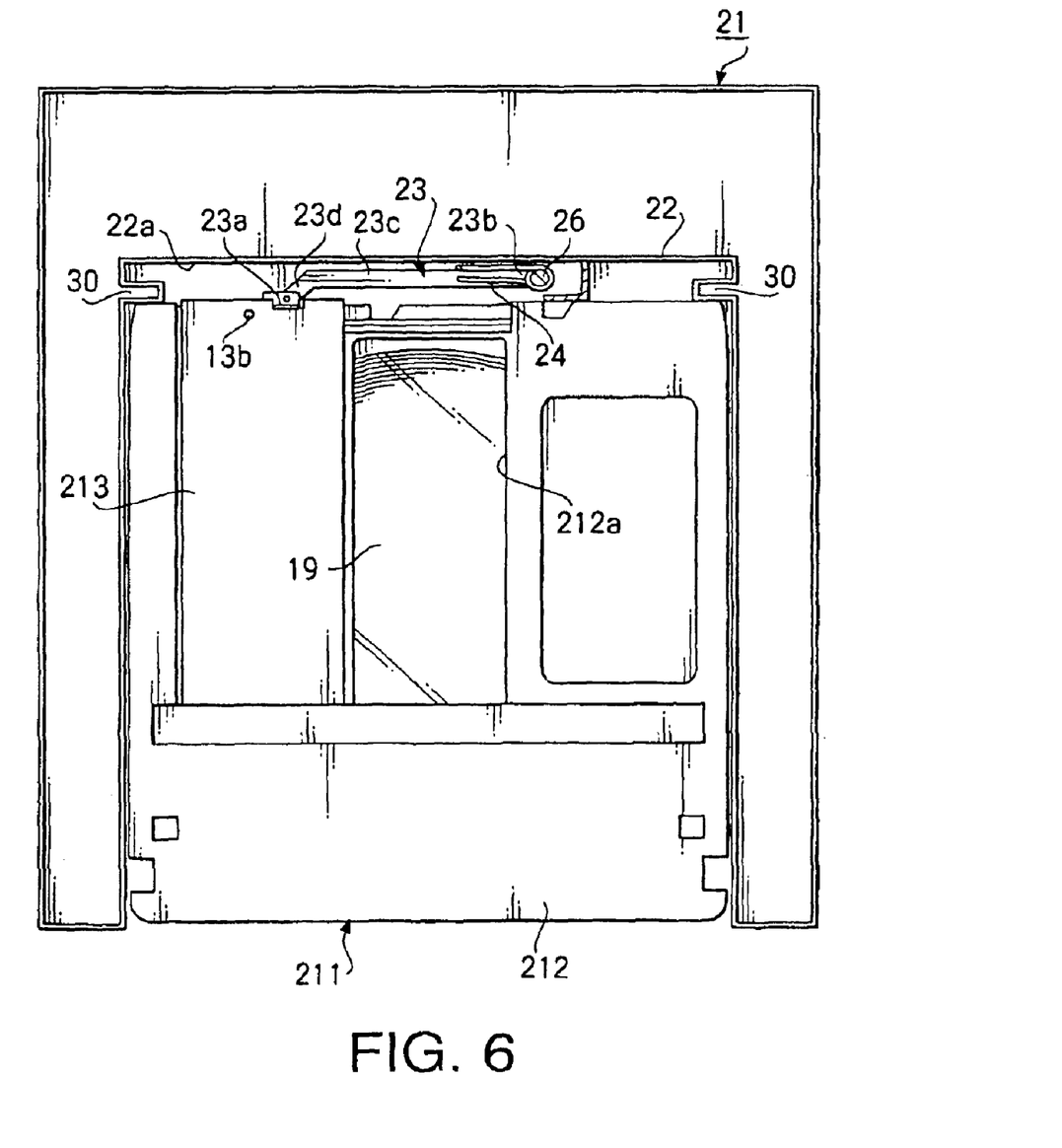
FIG. 6 shows the optical disc drive system, according to the second embodiment, in which an optical disc cartridge is fully inserted into a slot formed on an optical disc drive.

FIGS. 5 and 6 show an optical disc drive system 201 according to the second embodiment of the present invention. The optical disc drive system 201 has an optical disc cartridge 211 and an optical disc drive 21. The feature of the second embodiment is that a release mechanism for releasing a shutter 213 is actuated by an attractive force exerted on a lock arm 214 (see FIG. 7). Therefore, an explanation of the second embodiment will focus on a lock mechanism and the release mechanism for the shutter 213.

In each of FIGS. 5–8, to elements which are similar to those in FIGS. 1–4, the same reference numbers are assigned, and the detailed description thereof will not be repeated.

FIG. 5 shows a situation where the optical disc cartridge 211 is not fully inserted into the slot 22 of the optical disc drive 21. FIG. 6 shows a situation where the optical disc cartridge 211 is fully inserted into the slot 22 of the optical disc drive 21.

Figure 7:
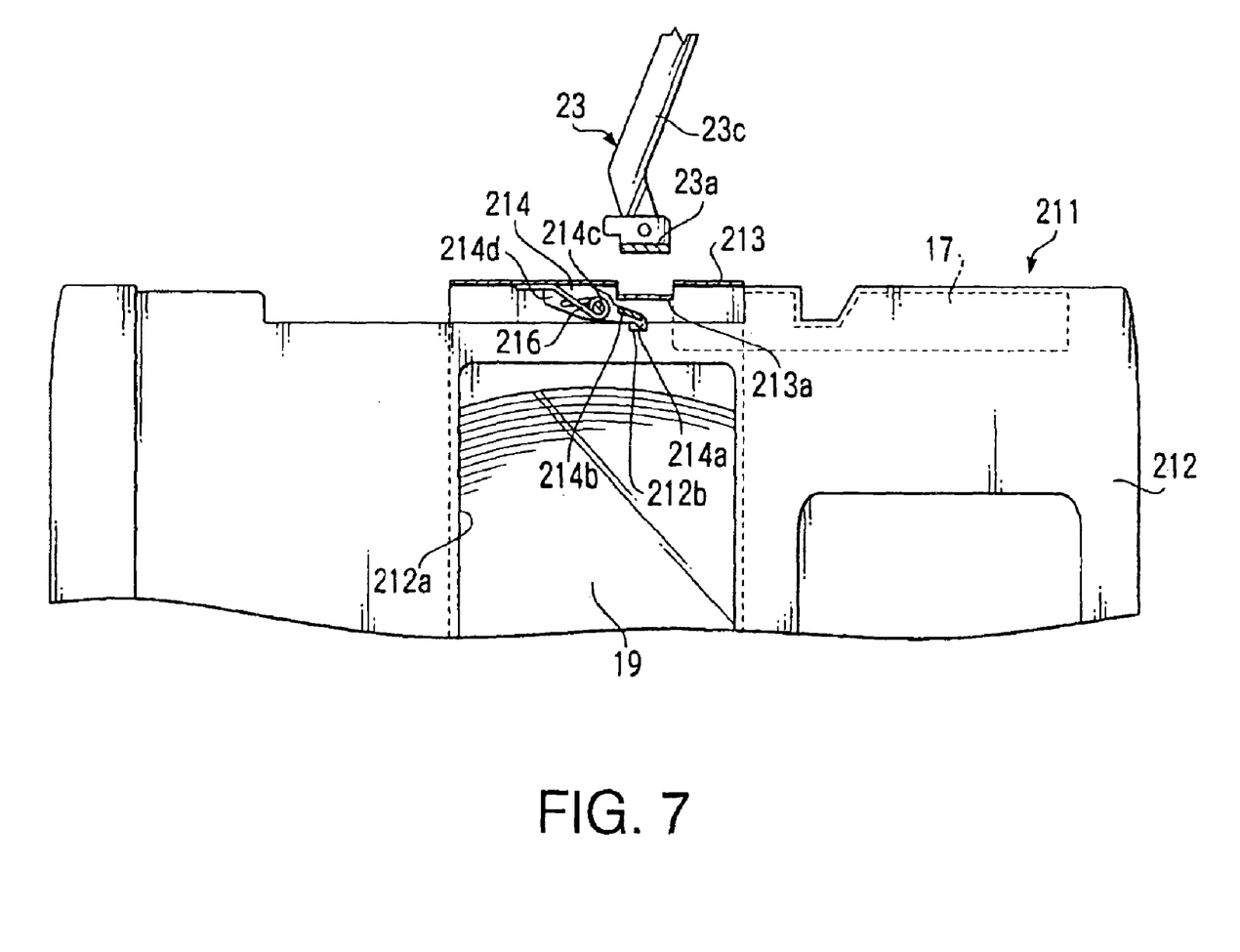
FIG. 7 is an enlarged view of the optical disc cartridge according to the second embodiment illustrating a situation where a magnet of a shutter open arm does not engage with a notch of a shutter.
Figure 8:
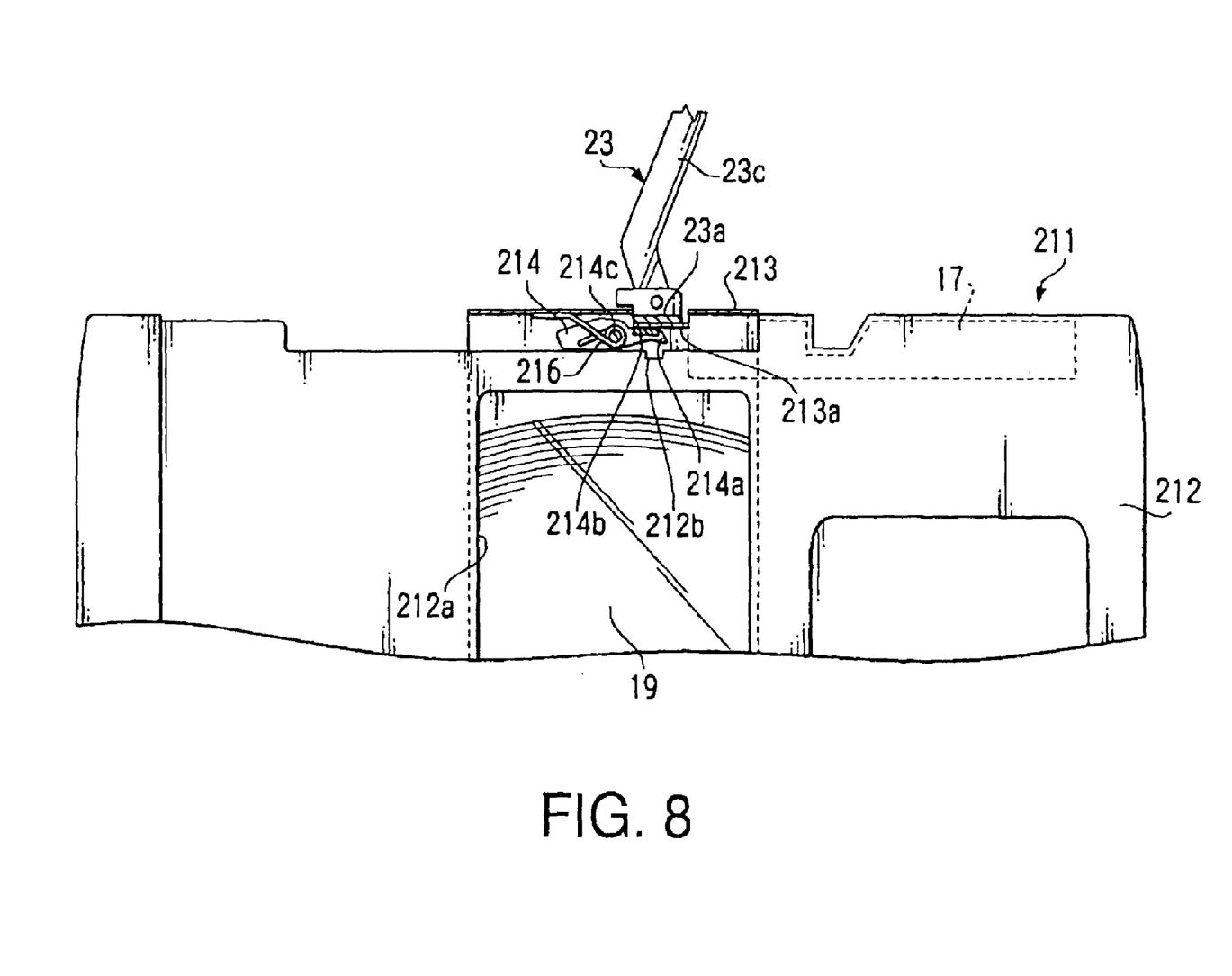
FIG. 8 is an enlarged view of the optical disc cartridge according to the second embodiment illustrating a situation where the magnet of the shutter open arm engages with the notch of the shutter.

Each of FIGS. 7 and 8 is an enlarged view of an upper portion of the optical disc cartridge 211. As shown in FIG. 7, the optical disc cartridge 211 has the spacer 17 which is mounted inside the case 212 and which is fixed to the shutter 213. The spacer 17 is guided by rails (not shown) formed on an inside surface of the case 212 and is slidable in a horizontal direction on FIG. 7.

The optical disc cartridge 211 has the lock arm 214 and a torsion spring 216. The lock arm 214 has a shaft 214c and a hook 214a formed at one end thereof. The shaft 214c of the lock arm 214 is inserted into the hole 13b (see FIGS. 5 and 6) formed on the shutter 213 with the torsion spring 216 being hooked to the shaft 214c.

One end of the torsion spring 216 contacts with an inside surface of the shutter 213, and the other end of the torsion spring 216 is fixed to the lock arm 214 at a position between the shaft 214c and the other end 214d of the lock arm 214. With this structure, the torsion spring 216 exerts a force on the lock arm 214 to turn the lock arm 214 clockwise.

Since the hook 214a of the lock arm 214 is pushed downward in FIG. 7 by the torsion spring 216, the hook 214a firmly engages with a recess 212b formed on the case 212 while the shutter 213 is positioned at a position shown in FIG. 7, i.e., while the shutter 213 completely covers the opening 212a. Thus, the shutter 213 is locked by engagement of the hook 214a and the recess 212b.

It should be noted that the lock arm 214 is completely covered by the shutter 213 and the case 212 (see FIGS. 7 and 8), the lock arm 214 can not be moved by using, for example, a pin.

To the one end of the lock arm 214, a magnetic material 214b is also attached. Accordingly, as shown in FIG. 8, when the magnet 23a approaches the notch 213a of the shutter 213, the magnetic material 214b (i.e., the one end of the lock arm 214) is attracted by the magnet 23a and therefore the lock arm 214 is rotated counterclockwise by the attractive force exerted on the magnetic material 214b. Consequently, the hook 214a is disengaged from the recess 212b, which releases the locked state of the shutter 213 and makes the shutter 213 slidable on the case 212.

As the optical disc cartridge 211 is inserted to the slot 22, the shutter open arm 23 slides the shutter 213. Finally, the shutter open arm 23 brings the shutter 213 to the position shown in FIG. 6.

When the optical disc cartridge 211 is pulled out, the shutter open arm 23 slides the shutter 213 right and brings the shutter 213 to the position shown in FIG. 5 because the torsion spring 26 exerts the force on the shutter open arm 23 to turn the shutter open arm 23 counterclockwise.

Although the present invention has been described in considerable detail with reference to certain preferred embodiments thereof, other embodiments are possible.

For example, in the described embodiments, the shutter lock mechanism including the lock arm (14,214) and the torsion spring (16,216) is attached to the shutter (13,213), the shutter lock mechanism may be alternatively attached to the case (12,212) of the optical disc cartridge (11,211) so that the hook (14a,214a) of the lock arm engages with a recess form on the shutter.

Although, in the second embodiment, the magnetic material 214a is used to exert the attractive force on the lock arm 214, a magnet may be alternatively attached to the lock arm 214 to exert an attractive force on the lock arm 214. In this case, a magnetic pole of a notch 213a side surface of the magnet attached to the lock arm is opposite to a magnetic pole of a notch 213a side surface of the magnet 23a attached to the shutter open arm 23.

If the magnet is attached to the lock arm 214, the magnet 23a attached to the shutter open arm 23 may be replaced with a magnetic material to exert attractive forces between the magnetic material attached to the shutter open arm 23 and the magnet attached to the lock arm 214.

As described above, in the case of the second embodiment, the magnetic material 214b attached to the lock arm 214 can be replaced with a magnet. However, to use the magnetic material 214*b* is advantageous in that a distance at which attractive forces start to exert on the lock arm and the shutter open arm can be shorten in comparison with the case where the magnet is attached to the lock arm 214.

The present disclosure relates to the subject matters contained in Japanese Patent Applications No. 2002-251679, filed on Aug. 29, 2002, and No. 2002-251680, filed on Aug. 29, 2002, which are expressly incorporated herein by reference in their entireties.

What is claimed is:

1. An optical recording media cartridge for protecting an optical recording media, comprising:
   a case that accommodates the optical recording media and that has an opening from which the optical recording media is exposed;
   a shutter that is attached to said case and that is movable between a first position at which said shutter covers the opening and a second position;
   a shutter lock mechanism that locks said shutter while said shutter is positioned at the first position; and
   a shutter release mechanism that releases said shutter locked by said shutter lock mechanism by utilizing a magnetic force exerted thereon.

2. The optical recording media cartridge according to claim 1,
   wherein said shutter lock mechanism and said shutter release mechanism are mounted inside said case,
   wherein said optical recording media cartridge substantially completely covers said optical recording media, said shutter lock mechanism and said shutter release mechanism when said shutter is positioned at the first position.

3. The optical recording media cartridge according to claim 1, wherein at least a portion of the optical recording media is exposed when said shutter is positioned at the second position.

4. The optical recording media cartridge according to claim 1, wherein said shutter lock mechanism includes a lock member attached to said shutter, said lock member locking said shutter while said shutter is positioned at the first position.

5. The optical recording media cartridge according to claim 4,
   wherein said lock member has a hook that engages with a recess formed on said case while said shutter is positioned at the first position,
   wherein said shutter is locked by engagement of the hook and the recess.

6. The optical recording media cartridge according to claim 5,
   wherein said shutter release mechanism includes a magnet attached to said lock member,
   wherein the engagement of the hook of said lock member and the recess of said case is released by the magnetic force exerted on the magnet attached to said lock member.

7. The optical recording media cartridge according to claim 6, wherein the magnetic force exerted on the magnet is an attractive force.

8. The optical recording media cartridge according to claim 7, wherein the attractive force acts on the magnet when an external magnet approaches the magnet from outside the optical recording media cartridge.

9. The optical recording media cartridge according to claim 7, wherein the attractive force acts on the magnet when an external magnetic material approaches the magnet from outside the optical recording media cartridge.

10. The optical recording media cartridge according to claim 6, wherein the magnetic force exerted on the magnet is a repulsive force.

11. The optical recording media cartridge according to claim 10, wherein the repulsive force acts on the magnet when an external magnet approaches the magnet from outside the optical recording media cartridge.

12. The optical recording media cartridge according to claim 5,
    wherein said shutter release mechanism includes a magnetic material attached to said lock member,
    wherein the engagement of the hook of said lock member and the recess of said case is released by the magnetic force exerted on the magnetic material attached to said lock member.

13. The optical recording media cartridge according to claim 12, wherein the magnetic force exerted on the magnetic material is an attractive force.

14. The optical recording media cartridge according to claim 13, wherein the attractive force acts on the magnetic material when an external magnet approaches the magnetic material from outside the optical recording media cartridge.

15. The optical recording media cartridge according to claim 1, wherein said shutter lock mechanism includes a lock member attached to said case, said lock member locking said shutter while said shutter is positioned at the first position.

16. The optical recording media cartridge according to claim 15,
    wherein said lock member has a hook that engages with a recess formed on said shutter while said shutter is positioned at the first position,
    wherein said shutter is locked by engagement of the hook and the recess.

17. The optical recording media cartridge according to claim 16,
    wherein said shutter release mechanism includes a magnet attached to said lock member,
    wherein the engagement of the hook of said lock member and the recess of said shutter is released by the magnetic force exerted on the magnet attached to said lock member.

18. The optical recording media cartridge according to claim 16,
    wherein said shutter release mechanism includes a magnetic material attached to said lock member,
    wherein the engagement of the hook of said lock member and the recess of said shutter is released by the magnetic force exerted on the magnetic material attached to said lock member.

19. The optical recording media cartridge according to claim 1, wherein the magnetic force exerted on said shutter release mechanism is an attractive force.

20. The optical recording media cartridge according to claim 1, wherein the magnetic force exerted on said shutter release mechanism is a repulsive force.

21. The optical recording media cartridge according to claim 1, wherein said optical recording media includes an optical disc.

22. An optical recording media drive for recording/reproducing information to/from an optical recording media accommodated in a cartridge,
    said cartridge comprising:
    a case that accommodates the optical recording media and that has an opening from which the optical recording media is exposed;

a shutter that is attached to said case and that is movable between a first position at which said shutter covers the opening and a second position;

a shutter lock mechanism that locks said shutter while said shutter is positioned at the first position; and a shutter release mechanism that releases said shutter locked by said shutter lock mechanism by utilizing a magnetic force exerted thereon, said optical recording media drive comprising:

a body;

a magnet that exerts said magnetic force when said cartridge is attached to said optical recording media drive; and a shutter open member that moves said shutter of said cartridge from the first position to the second position when said cartridge is attached to said optical recording media drive.

23. The optical recording media drive according to claim 22, wherein said shutter open member includes an arm member roatatably attached to said body, the arm member having an end portion which engages with a notch formed on said cartridge, wherein the end portion of the arm member moves when said cartridge is attached to said optical recording media drive so as to move said shutter of said cartridge from the first position to the second position, wherein said magnet is attached to the end portion of the arm member.

24. The optical recording media drive according to claim 22, wherein said body has a slot to which said cartridge is attached.

25. An optical recording media drive for recording/reproducing information to/from an optical recording media accommodated in a cartridge, said cartridge comprising:

a case that accommodates the optical recording media and that has an opening from which the optical recording media is exposed;

a shutter that is attached to said case and that is movable between a first position at which said shutter covers the opening and a second position;

a shutter lock mechanism that locks said shutter while said shutter is positioned at the first position; and a shutter release mechanism that releases said shutter locked by said shutter lock mechanism by utilizing a magnetic force exerted thereon, said optical recording media drive comprising:

a body;

a magnetic material that exerts said magnetic force when said cartridge is attached to said optical recording media drive; and a shutter open member that moves said shutter of said cartridge from the first position to the second position when said cartridge is attached to said optical recording media drive.

26. A system having an optical recording media cartridge and an optical recording media drive for recording/reproducing information to/from an optical recording media accommodated in the optical recording media cartridge, said optical recording media cartridge comprising:

a case that accommodates the optical recording media and that has an opening from which the optical recording media is exposed;

a shutter that is attached to said case and that is movable between a first position at which said shutter covers the opening and a second position;

a shutter lock mechanism that locks said shutter while said shutter is positioned at the first position; and a shutter release mechanism that releases said shutter locked by said shutter lock mechanism by utilizing a magnetic force exerted thereon, said optical recording media drive comprising:

a body;

a magnet that exerts said magnetic force when said cartridge is attached to said optical recording media drive; and a shutter open member that moves said shutter of said optical recording media cartridge from the first position to the second position when said optical recording media cartridge is attached to said optical recording media drive.

27. A system having an optical recording media cartridge and an optical recording media drive for recording/reproducing information to/from an optical recording media accommodated in the optical recording media cartridge, said optical recording media cartridge comprising:

a case that accommodates the optical recording media and that has an opening from which the optical recording media is exposed;

a shutter that is attached to said case and that is movable between a first position at which said shutter covers the opening and a second position;

a shutter lock mechanism that locks said shutter while said shutter is positioned at the first position; and a shutter release mechanism that releases said shutter locked by said shutter lock mechanism by utilizing a magnetic force exerted thereon, said optical recording media drive comprising:

a body;

a magnetic material that exerts said magnetic force when said cartridge is attached to said optical recording media drive; and a shutter open member that moves said shutter of said optical recording media cartridge from the first position to the second position when said optical recording media cartridge is attached to said optical recording media drive.

* * * * *